United States Patent [19]

Sun

[11] Patent Number: 4,959,271
[45] Date of Patent: Sep. 25, 1990

[54] MULTILAYER SHEET

[75] Inventor: Yun C. Sun, Midland, Mich.

[73] Assignee: The Dow Chemical Company, Midland, Mich.

[21] Appl. No.: 215,851

[22] Filed: Jul. 6, 1988

[51] Int. Cl.$^5$ .......................... B32B 27/08; B28B 3/20
[52] U.S. Cl. .............................. 428/476.3; 428/476.9; 428/507; 428/516; 428/518; 264/175; 264/176.1; 156/327
[58] Field of Search ...................... 428/518, 516, 476.3, 428/476.9, 507

[56] References Cited

U.S. PATENT DOCUMENTS

| | | | |
|---|---|---|---|
| 3,102,050 | 8/1963 | Smith et al. | |
| 3,188,165 | 6/1965 | Tanner et al. | |
| 3,725,375 | 4/1973 | Sturt. | |
| 3,873,643 | 3/1975 | Wu et al. | 260/878 R |
| 3,875,130 | 4/1975 | Kemp. | |
| 3,987,122 | 10/1976 | DiCresce et al. | |
| 4,112,181 | 9/1978 | Baird, Jr. et al. | 428/518 |
| 4,143,011 | 3/1979 | Uehara et al. | |
| 4,195,137 | 3/1980 | Walker. | |
| 4,477,532 | 10/1984 | Schmukler et al. | 428/441 |
| 4,536,545 | 8/1985 | Walker. | |
| 4,595,726 | 6/1986 | Klosiewicz. | |

FOREIGN PATENT DOCUMENTS

| | | |
|---|---|---|
| 8316368-A | 1/1982 | Australia. |
| 0001313 | 9/1978 | European Pat. Off. |
| 49-31305 | 8/1974 | Japan. |

*Primary Examiner*—P. C. Sluby
*Attorney, Agent, or Firm*—Thomas D. Zindrick

[57] ABSTRACT

An article for the storage of food products, the body of the article comprising multilayers of different thermoplastic resins which together provide excellent water vapor and gas barrier properties to preserve the food product while in its packaged state. The article contains at least one skin layer, one barrier layer, and a tie layer interposed between each skin layer and the barrier layer. The tie layer contains a graft copolymer formed from a polymerizable mixture comprising a monomer mixture and a preformed polymer which is capable of imbibing the monomer mixture. The preformed polymer is allowed to contact the monomer mixture for a length of time and at a temperature such that enough of the monomer mixture is imbibed therein, and then the polymerizable mixture is polymerized.

32 Claims, No Drawings

MULTILAYER SHEET

FIELD OF THE INVENTION

This invention provides multilayer structures for making articles for food packaging. More specifically, this invention pertains to a multilayer structure having an improved tie layer.

BACKGROUND OF THE INVENTION

Thermoplastic materials useful for producing flexible or rigid articles for food packaging are well known.

Such an article may either retain or repel water vapor from the contents and/or prevent the transmission of oxygen into the contents, respectively. For example, when oxygen penetrates into a article it will combine with oils and cause off-taste and rancidity. Other food products, such as foods having a high starch or sugar content, can be damaged by picking up water.

There has, therefore, been a long felt desire on the part of the food packaging industry to have a relatively inexpensive plastic article which provides excellent oxygen and water vapor barrier properties, and which withstands article failure at different temperatures.

Such articles can typically be formed from single-layered or multi-layered structures. Typically, if the article is formed from a multi-layer structure, it has at least one outside, or skin, layer, a barrier layer, and an adhesive, or tie, layer interposed between each skin layer and the barrier layer. Thus, in a thermoplastic structure having one outer layer and one inner layer, there will be one tie layer therebetween. In a structure having three thermoplastic layers, there will be two tie layers provided. Generally, in multi-layered structures the inner and outer layers are coextruded with the tie layer therebetween.

Such articles are useful for the packaging of dry food stuffs which must be kept in low water content as, for example, dried soup and gravy mixes or powdered sugar; of foods that require that a water content be maintained such as condensed soups, canned fruits and vegetables; or food which must be kept free from oxygen permeation such as meat products or other like foods containing oils or fats.

The price of metal cans over the past years has continued to increase while that of many plastic materials has decreased. In addition to lower cost, other benefits of plastic articles include relatively easy disposal, in that plastic can be burned: cleanliness, in that plastic does not rust; elimination of permanent denting which is common in metal cans: and microwaveability.

It has been found that with a plastic article having walls comprised of different materials that proper choice of layer materials can also render the articles heat retortable for sterilization of the contents after packaging thereof in the articles, thereby giving the packaged food an extended shelf life without requiring refrigeration.

It is an object of the present invention to provide a composition useful as the tie layer for a multilayer structure, which composition has improved adhesion to the skin layer(s) and the barrier layer.

It is a further object of the present invention to provide a multilayer plastic container for the storage of food products which not only has high moisture and gas barrier properties but also has improved peel strength among the layers.

SUMMARY OF THE INVENTION

In one embodiment, the present invention is a multilayer structure of indefinite running length, said structure comprising: (A) at least one skin layer of a supporting resin; (B) a barrier layer comprising a vinylidene chloride interpolymer, the interpolymer being formed from a monomer mixture comprising vinylidene chloride in an amount of from about 60 to about 99 weight percent, based on total weight of monomer mixture, and at least one monoethylenically unsaturated monomer copolymerizable therewith in an amount of from about 40 to about 1 weight percent, based on total weight of monomer mixture; and (C) at least one tie layer interposed between each skin layer and the barrier layer; (i) wherein the tie layer comprises a graft copolymer polymerized from a polymerizable mixture comprising (a) from about 95 to about 15 weight percent of a mixture of at least one monomer, and (b) from about 5 to about 85 weight percent of a preformed polymer, said weight percents being based upon the total polymerizable mixture weight; and (ii) wherein at least one monomer of the monomer mixture is capable of grafting to the preformed polymer upon polymerization; and the preformed polymer is selected to be compatible with the polymer of the outer skin layer, and to be capable of imbibing enough of the monomer mixture therein such that, upon polymerization, the graft copolymer has at least 5 percent of the monomer mixture grafted to the preformed polymer.

In another embodiment, the present invention is an article for the storage of foods which are sensitive to atmospheric gases, said article formed from a multilayer structure of indefinite running length, said structure comprising: (A) at least one skin layer of a tough, body supporting resin, said skin layer being present in an amount of between about 40 and about 90 weight percent based on the total weight of the multilayer structure; (B) a barrier layer which comprises a resin having high gas barrier properties, such other layer being other than the skin layer, said barrier layer being present in an amount of between about 5 and about 50 weight percent based on the total weight of the multilayer structure; and (C) at least one tie layer between the skin layer and the barrier layer, said tie layer being present in an amount of between about 5 and about 40 weight percent based on the total weight of the multilayer structure; and wherein said tie layer comprises a graft copolymer comprising a polymerizable mixture which comprises (1) from about 95 to about 15 weight percent, based on total polymerizable mixture weight, of a monomer mixture; and (2) from about 5 to about 85 weight percent, based on total polymerizable mixture weight, of a preformed polymer, said preformed polymer having enough of the monomer mixture imbibed therein that the graft copolymer has at least 5 percent of the monomer mixture grafted to the preformed polymer.

DESCRIPTION OF THE INVENTION

According to the present invention there is provided a material in the form of a multilayer, planar structure of indefinite length. According to another aspect of the present invention, there is provided a plastic article formed from the multilayer structure. By "article" is meant that to include mono and multilayer, films for making flexible bags or relatively rigid containers; rigid sheet for making relatively rigid barrier containers; tubes; pipes; rods; fibers; and various profiles.

The body of the plastic articles comprise multilayers of different thermoplastic resins. The layers provide adequate strength and barrier properties, permitting packaging of food which needs excellent protection from oxygen and/or water vapor permeation into or out of the article.

The skin layer may comprise a tough, high melting resin such as olefinic polymers or copolymers. Plastic materials of satisfactory structural strength for use in the skin layers are thermoplastic organic polymers including the polyolefins: polymers based on monovinylidene aromatic monomers, and the like. Exemplary plastic materials for use in the skin layer include polyethylene, polypropylene, polystyrene, and the like. Polypropylene is most preferred.

The total amount of skin layer present in the multilayer article may vary in thickness, depending upon the particle application in which the article is to be used. The total amount of skin layer in the multilayer structure is generally from about 10 percent to about 40 percent of the total thickness of the structure. In relatively rigid articles, the skin layer thickness generally will be from about 4 mils to about 13 mils. In relatively flexible articles, each skin layer thickness generally will be from about 0.2 mils to about 3 mils.

Additional layers of plastic material may also be coextruded along with the above mentioned skin layers to effect a variation in the desired characteristics in the film, provided that the additional plastic material is compatible with the polymer of the skin layer. In accordance with coextrusion techniques, the respective polymer compositions are fed into separate polymer feeding devices of a coextrusion apparatus.

Processes for forming and using multi-layer structures such as those described above inherently produce a certain amount of scrap material. From an economic standpoint, it is desirable to employ this scrap material in a useful manner. Generally, the scrap material may be incorporated between the skin layer and the tie layer. The scrap, obviously, will comprise a majority of the polymer employed in the skin layer of the multi-layer structure, as well as a minor portion of the thermally sensitive polymer employed in the barrier layer and the polymer which forms the tie layers. The portion of polymer from the skin layer will form a continuous phase with the outer layer and generally does not require the use of an additional tie layer. The scrap material is generally between from about 5 to about 20 weight percent, based on the total weight of the skin layer.

The barrier layer can comprise a material having high oxygen barrier properties. The primary requirements for the barrier layer are that the material be extrudable within a sheath of another polymer and that the composition have the desired gas and moisture vapor transmission barrier characteristics. Vinylidene chloride interpolymers are preferably employed as the barrier layer.

For the purposes of this invention, it is understood that the term "vinylidene chloride interpolymer" encompasses both homopolymers, and interpolymers of vinylidene chloride monomer. The vinylidene chloride interpolymer comprises vinylidene chloride copolymerized with another monoethylenically unsaturated monomer.

Monoethylenically unsaturated comonomers suitable for copolymerization with vinylidene chloride include vinyl chloride, alkyl acrylates, alkyl methacrylates, acrylic acid, methacrylic acid, itaconic acid, acrylonitrile, and methacrylonitrile. The monoethylenically unsaturated comonomers are desirably selected from the group consisting of vinyl chloride, alkyl acrylates, and alkyl methacrylates, the alkyl acrylates and alkyl methacrylates having from about 1 to about 8 carbon atoms per alkyl group. The alkyl acrylates and alkyl methacrylates preferably have from about 1 to about 4 carbon atoms per alkyl group. The alkyl acrylates and alkyl methacrylates are most preferably selected from the group consisting of methylacrylate, ethylacrylate, and methyl methacrylate.

The monomer mixture comprises a vinylidene chloride monomer generally in the range of from about 60 to about 99 weight percent and the monoethylenically unsaturated comonomer in an amount of from about 40 to about 1 weight percent, said weight percents being based on total weight of the vinylidene chloride interpolymer. The preferred ranges are dependent upon the monoethylenically unsaturated comonomer copolymerized therewith, each are well-known to one skilled in the art.

Methods of forming the vinylidene chloride interpolymers suitable for use in the present invention are well-known in the prior art. The vinylidene chloride interpolymer is generally formed through an emulsion or suspension polymerization process. Exemplary of such processes are U.S. Pat. Nos. 2,558,728: 3,007,903; 3,642,743; and 3,879,359: and the methods described by R. A. Wessling, in *Polyvinylidene Chloride,* Gordon and Breach Science Publishers, New York, 1977, Chapter 3; all of which are incorporated herein by reference.

Beneficially, in the extrusion of the vinylidene chloride interpolymers, it is frequently advantageous and beneficial to incorporate additives well-known to those skilled in the art. Exemplary of additives which may be incorporated in the package are light stabilizers such as hindered phenol derivatives: pigments such as titanium dioxide and the like, plasticizers, lubricants, extrusion aids and the like. Each of these additives is known and several types of each are commercially available. The additives may be incorporated by methods such as conventional melt blending and dry blending techniques.

Each barrier layer may vary in thickness, depending upon the particle application in which the article is to be used. The barrier layer thickness is generally from about 10 percent to about 40 percent of the total thickness of the multilayer structure. In relatively rigid articles, the barrier layer thickness will be from between about 1.5 to about 5 mils thick. In relatively flexible articles, the barrier layer thickness will be from about 0.1 to about 2 mils.

The total amount of tie layer present in the multilayer article may vary in thickness, depending upon the particle application in which the article is to be used. Each tie layer is generally from about 2 percent to about 20 percent of the total thickness of the structure. In relatively rigid articles, the skin layer thickness generally will be from about 0.1 mils to about 3 mils. In relatively flexible articles, each skin layer thickness generally will be from about 0.5 mils to about 3 mils. The tie layer is present in an amount of between about 5 and about 40 weight percent based on the total weight of the multilayer structure.

The tie layer of the present invention comprises a graft copolymer prepared from a polymerizable mixture comprising two components. The first component is a graftable preformed polymer, the second component is a monomer mixture having as the major component a monomer selected from the group consisting of (1) vinylidene chloride and (2) $C_1$–$C_8$ alkyl methacrylates.

Typically, the graft polymerization process involves polymerizing the monomers in the polymerizable mixture to chemically combine or graft at least a portion of the polymerized monomer mixture on the graftable preformed polymer. The selection of a specific preformed polymer and a monomer mixture depends upon the adhesion requirements among the layers of the multilayer structure.

The graftable preformed polymer is selected to provide interfacial adhesion with the polymer of the skin layer, and is selected to be effectively swellable i.e., capable of imbibing sufficient monomer mixture without dissolving therein. By "effectively swellable" is meant that upon polymerization, the preformed graft copolymer has a sufficient amount of polymerized monomer grafted therewith to improve the interfacial adhesion. After polymerization, the preformed graft copolymer should have least 5 percent, preferably 15 percent, most preferably 30 percent, of the monomer mixture grafted to the preformed polymer.

By "improved" interfacial adhesion is meant that tie layer comprising the graft components has greater peel strength with either the skin or barrier layer than a tie layer having the same components in an ungrafted state. For the purpose of this invention, peel strength is defined as the strength of the cohesive bond formed between the tie layer and either of the two opposing, contacting skin and barrier layers, respectively. Peel strength is conventionally measured when said layers are subjected to a peeling pressure and to temperatures below the heat distortion point of the tie layer—specifically at approximately room temperature (23° C.) and at a retort temperature (120° C.). For the purposes of this invention, the peel strength between the tie layer and either the skin or barrier layer will generally be from about 5 to about 30 pounds per inch of width at 23° C.; and from about 1 to about 5 pounds per inch of width at 120° C.

Generally, the polymerizable mixture comprises the preformed polymer in an amount of from about 5 to about 85 weight percent and the monomer mixture in an amount of from about 95 to about 15, said weight percents based upon the total weight of the polymerizable mixture. Preferably, the preformed polymer will be present in an amount of from about 10 to about 70 weight percent and the monomer mixture in an amount of from about 90 to about 30, said weight percents based upon the total weight of the polymerizable mixture.

The graftable preformed polymers is suitably an olefin polymer. The term "olefin polymer" includes homopolymers and copolymers of α-monoolefins and substituted α-monoolefins, particularly α-monoolefins or substituted α-monoolefins having from 4 to 12 carbon atoms. Exemplary α-monoolefins homopolymers include polyethylene (e.g., ultra-low density polyethylene, low density polyethylene, linear low density polyethylene, medium density polyethylene, high density polyethylene): poly(butene-1), poly(isobutylene): poly(1-pentene); poly(1-hexene); and poly(1-octene). Substituted α-monoolefins include ethyl acrylate, n-butyl acrylate, and i-butyl acrylate, and halogenated α-monoolefin polymers such as vinyl chloride, chlorinated polyethylene and chlorinated polypropylene. In such halogented α-monoolefin polymers, the halogen bonded to the α-monoolefin polymer backbone supplies all or part of the halogenated organic moiety. Generally, such substituted α-monoolefin polymers contain from about 1 to about 40 weight percent of chlorine, preferably about 5 to about 25 weight percent chlorine.

It is also understood that "olefin polymer" includes α-monoolefin/α-monoolefin polymers such as ethylene-containing polypropylenes including ethylene/propylene copolymers; and ethylene/butene-1 copolymers: α-monoolefin/substituted α-monoolefin copolymers.

The α-monoolefins and substituted α-monoolefins may also be copolymerized with a variety of suitable comonomers such as carbon monoxide, and carboxylic acids having from 3 to 8 carbon atoms (e.g., ethylene vinyl acetate and ethylene acrylic acid), and derivatives of carboxylic acids. When employing an α-monoolefin/substituted α-monoolefin copolymer, the substituted α-monoolefins preferably constitutes up to about 50 weight percent of the copolymer with the remainder being α-monoolefin.

Finally, the term "olefin polymer" includes polyethylene terephthalate and copolymers thereof. Polyethylene terephthalate includes (a) polymers wherein at least about 97% of the polymer contains repeating ethylene terephthalate units with any remainder being minor amounts of ester forming components, and (b) copolymers of ethylene terephthalate including a copolymer of polyether and polyethylene terephthalate (polyesterethers). Typical aromatic or cycloaliphatic dicarboxylic acids having 8 to 12 carbon atoms useful in forming the polyesterether include terepthalic: ispothalic: napthalene dicarboxylic: 1,4-cyclohexane dicarboxylic acids: or combinations thereof.

Typical aliphatic or cycloaliphatic glycols having 2 to 10 carbon atoms useful in forming the copolyester ethers include those such as ethylene; propylene; 1,4-butanediol; neopenty glycol: 1,6-hexanediol; 1,4-cyclohexanediol: and 1,5-pentanediol: or combinations thereof.

Typical useful polyether glycols having 2–4 carbon atoms between ether units include polytetramethylene ether glycol: polyethylene ether glycol; and combinations thereof.

Conventional polymerization techniques, well known to those skilled in the art, may be used in producing the polyester ethers used in this invention.

Exemplary polyester ethers include Eastman PCCE 9967, commercially available from Eastman Chemical Products, Inc. Other suitable polyester ethers include PCCE 9965, and PCCE 5154, all of which are available from Eastman. These particular polyester ethers are all characterized by inherent viscosities of ranging from 1.05 to 1.28, and by the use of 1,4-cyclohexanediol; 1,4 cyclohexane dicarboxylic acid, and polytetramethylene glycol ether as reactants in producing the polyester ether.

Preferred olefin polymers include polyethylene; chlorinated polyethylene; ethylene/vinyl acetate copolymers: ethylene/ethyl acrylate copolymers: ethylene/acrylic acid copolymers: ethylene/carbon monoxide copolymers: polyester ethers: and ethylene-containing polypropylenes. When polypropylene is selected to be the skin layer, the ethylene-containing polypropylenes are the most preferred olefin polymers.

It is understood that the preformed polymers may contain polyblends of the olefin polymers. The preformed polymer may also contain polyblends of at least one olefin polymer and at least one nonolefin polymer, provided that at least 5% of the monomer mixture is grafted to the graftable preformed polymer and the nonolefin polymer is compatible with the major polymer of the skin layer.

Methods of forming the preformed polymer are well-known to those skilled in the art. A general description of methods suitable for the preparation of the preformed polymers are set forth in the *Kirk-Othmer Encyclopedia of Chemical Technology*, 3rd edition, (1980).

As previously mentioned, the monomer mixture comprises as its major component a monomer selected from the group consisting of (1) vinylidene chloride and (2) $C_1$–$C_8$ alkyl methacrylates.

In the first embodiment, wherein vinylidene chloride is selected as the major component of the tie layer monomer mixture, the tie layer monomer mixture is present in an amount of from about 60 to 90 weight and the preformed polymer is present in an amount of from about 40 to about 10 weight percent, said weight percents being based upon the total weight of the tie layer polymerizable mixture. Preferably, the tie layer monomer mixture is present in an amount of from about 60 to 80 weight percent of the polymerizable mixture and the preformed polymer is present in an amount of from about 40 to about 20 weight percent, said weight percents based upon the total weight of the tie layer polymerizable mixture. Most preferably, the tie layer monomer mixture is present in an amount of from about 60 to 70 weight percent of the polymerizable mixture and the preformed polymer is present in an amount of from about 40 to about 30 weight percents, said weight percents based upon the total weight of the tie layer polymerizable mixture.

The tie layer monomer mixture will also suitably contain an ethylenically unsaturated monomer or monomers copolymerizable with the vinylidene chloride monomer. Generally, the vinylidene chloride is present in an amount of from about 60 to about 98 weight percent, preferably from about 65 to about 96 weight percent, and most preferably from about 70 to about 94 weight percent and the ethylenically unsaturated monomer or monomers copolymerizable is present in an amount of from about 2 to about 40 weight percent, preferably from about 4 to about 35 weight percent, and most preferably from about 6 to about 30 weight percent. The weight percents are based on total tie layer monomer mixture weight.

Suitable monoethylenically unsaturated monomers copolymerizable with the vinylidene chloride monomer include vinyl chloride, alkyl acrylates, alkyl methacrylates, acrylic acid, methacrylic acid, itaconic acid, acrylonitrile and methacrylonitrile. Desirable ethylenically unsaturated monomers copolymerizable with the vinylidene chloride monomer are selected from the group consisting of vinyl chloride, alkyl acrylate, and alkyl methacrylates, the alkyl acrylates and alkyl methacrylates having from about 1 to about 8 carbon atoms per alkyl group. Preferably, the ethylenically unsaturated monomer copolymerizable with the vinylidene chloride monomer is selected from the group consisting of vinyl chloride, methyl acrylate, ethyl acrylate, and methylmethacrylate.

When the tie layer is formed from vinylidene chloride monomers, such tie layer has the additional advantage of possessing excellent barrier to the mass transport of atmospheric gases and water vapor.

In the second embodiment, wherein a $C_1$–$C_8$ alkyl methacrylate is selected as the major component of the tie layer monomer mixture, the monomer mixture is generally present in an amount of from about 25 to 95 and the preformed polymer is present in an amount of from about 75 to about 5 weight percent, said weight percents being based upon the total weight of the tie layer polymerizable mixture. Preferably, the monomer mixture is present in an amount of from about 40 to 80 and the preformed polymer is present in an amount of from about 60 to about 15 weight percent, said weight percents being based upon the total weight of the tie layer polymerizable mixture. Most preferably, the monomer mixture is present in an amount of from about 55 to 65 weight and the preformed polymer is present in an amount of from about 45 to about 35 weight percents, said weight percents being based upon the total weight of the tie layer polymerizable mixture.

From an economic standpoint methyl methacrylate is preferred. The monomer mixture may contain minor proportions of one or more vinyl monomers. $C_1$–$C_8$ alkyl methacrylates include methyl, ethyl, propyl, butyl, octyl, and laurylmethacrylate. Exemplary vinyl monomers include styrene; acrylonitrile: vinyl acetate: methyl methacrylate: ethylenically unsaturated carboxylic acids such as, for example, acrylic, methacrylic, itaconic and maleic acids: isoprene, chloroprene: 1,3-butadiene: propylene: ethylene: and other common vinyl monomers.

Mixtures of $C_1$–$C_8$ alkyl methacrylates may also be employed, with a mixture of from about 50 to about 70 weight percent methyl methacrylate and from about 30 to about 50 weight percent of butyl methacrylate being preferred.

The preformed polymer is physically mixed with the monomer mixture to form the polymerizable mixture. According to the present invention, the preformed polymer is selected so that it is capable of imbibing the monomer mixture. The amount of monomer mixture imbibed by the preformed polymer is dependent on the temperature of the polymerizable mixture, the size and shape of the preformed polymer, the length of time for which the preformed polymer is allowed to contact the monomer mixture, and, of course, the composition of the monomer mixture and the preformed polymer employed. It is preferred that essentially all of the monomer mixture be imbibed by the preformed polymer. This is preferred because it allows for the formation of a more intimate blend of the preformed polymer and the polymer formed from the monomer mixture.

The optimum conditions under which the preformed polymer is allowed to contact the monomer mixture is easily determined by simple experimentation. It is desirable that the preformed polymer contact the monomer mixture for that length of time and at that temperature which allow for a relatively rapid imbibition of the monomer mixture by the preformed polymer. Nonetheless, it is important that the time and temperature be selected so that the preformed polymer does not dissolve in the monomer mixture.

Generally, the preformed polymer will be allowed to contact the monomer mixture for a period of time of from about 20 to about 2000 minutes, preferably from about 240 to about 1400 minutes. The preformed polymer will contact the monomer mixture at a temperature of from about 50° centigrade to about 100° centigrade, and preferably from about 60° centigrade to about 100° centigrade.

The monomer mixture will be generally uniformly imbibed within the preformed polymer, providing a relatively homogeneous polymer blend. Consequently, the graft sites between the preformed polymer and the polymer formed from the monomer mixture are generally uniformly distributed throughout the graft copolymer. It is preferred that essentially all of the monomer mixture be imbibed by the preformed polymer, because it provides a higher the saturation of the preformed polymer with the monomer mixture and the concommitant formation of a more intimate blend of the preformed polymer and the polymer formed from the monomer mixture.

The polymerizable mixture is then polymerized such that at least a portion of the polymerized monomer mixture chemically combines or grafts on the graftable preformed polymer. The polymerizable mixture is suitably polymerized through an emulsion or suspension polymerization process. Emulsion and suspension polymerization processes are well known in the prior art. Generally, the polymerizable mixture is emulsified or suspended in an aqueous medium through the use of emulsifying or suspending agents. An initiator is then added to the solution and polymerization of the monomers allowed to proceed until achieving its desired degree of conversion.

For convenience in preparation, the graft copolymer may be physically postblended to form an intimate polymer polyblend with a small domain size with either (1) additional preformed polymer or (2) a separately polymerized monomer mixture, that is, an amount of monomer mixture which is not polymerized in the presence of or grafted to the graftable preformed polymer substrate. Such postblending permits easily obtained ratios of preformed polymer and monomer mixture to be selected. However, because the postblended polymer is not a graft copolymer, the amount of post-blended polymer present in the tie layer should generally be within the range of from 0 to about 80 weight percent, based on total tie layer weight.

The graft copolymer and post-blended polymer are readily blended by using conventional melt processing techniques for thermally sensitive polymers. Exemplary melt processing equipment includes heated two roll compounding mills, Brabender mixers, Banbury mixers, single screw extruders, twin screw extruders, and the like, which are constructed for use with thermally sensitive polymers. See, for example, the discussion by R. Wessling, in Chapter 11 of *Polyvinylidene Chloride*, Vol 5, Gordon and Breach Science Publishers, New York, 1977, the teachings of which are incorporated herein by reference. Desirable results are obtained when an extruder, either single screw or twin screw, is used. Beneficially, sufficient mixing must be generated during melt processing to provide a visually homogeneous blend with a reasonable mixing time.

In using conventional melt processing equipment for thermally sensitive polymers, three conditions should be met. Two conditions, which are interrelated, are processing time and processing temperature. In melt processing polymers, it is generally recognized that as processing temperatures increase, processing times must decrease in order to avoid undesirable results such as polymer degradation. The third condition is that sufficient mixing must be generated during melt processing to provide a visually homogeneous blend with a reasonable mixing time.

The process of the present invention can be used to form a variety of articles. As is well known in the art, the articles are fabricated using conventional techniques such as coextrusion, e.g, feedblock coextrusion, multimanifold die coextrusion, or combinations of the two; injection molding; and extrusion molding, blow molding and cast molding.

Articles made from the multilayer structures of this invention are ideally suited for storing products that are sensitive to oxygen, carbon dioxide or moisture; products that have an elusive fragrance that is desirably retained: products that may pick up unwanted odors from the environment; or products that contain highly volatile components. Products advantageously packaged in articles fabricated from the multilayer structure of this invention include, for example, cheese, butter, steroids, various medicines, dried foods and the like.

The invention is further illustrated by the following examples.

EXAMPLES

EXAMPLE 1

A relatively rigid, five layer, coextruded sheet is prepared. The five layer structure has a central barrier layer having two generally planar, generally parallel outer surfaces. Disposed on each of the generally planar, generally parallel outer surfaces of the central barrier layer is an adhesive layer, each adhesive layer having disposed thereon an outer skin layer. Each outer layer has a thickness of about 11 mils, the core layer has a thickness of about 3 mils, and each tie layer is about 1.5 mils thick.

The outer skin layer is formed from polypropylene (PP) commercially available from Exxon, Inc. under the trade designation Exxon 4092. The polypropylene has a melt flow rate of 2.5. The barrier layer comprises a vinylidene chloride interpolymer commercially available from The Dow Chemical Company under the trade designation Saran MA 119. Saran MA 119 has a major melting point of about 155° C. and a weight average molecular weight of 85,000.

The tie layers comprise a graft copolymer (GP) formed by charging 3383 grams of a preformed polymer into a ten gallon stirred polymerization reactor. The preformed polymer is a propylene resin, containing about 13 weight percent ethylene, commercially available from Himont Inc. under the trade designation PP SB-751, is loaded. To the PP SB-751 in the reactor is added 12,000 grams of demineralized water; 0.5 grams of di-tert-butylmethylphenol; 20 grams of tertiary butyl peroctoate: a monomer mixture comprising 5904 grams of vinylidene chloride and 380 grams of methyl acrylate: 80 grams of epoxidized linseed oil; and 20 grams of methylpropyl cellulose ether as a suspending agent.

The reactor is sealed, purged with nitrogen and slowly elevated to a temperature of about 80° C. and polymerization is allowed to continue for about 16 hours. The resultant polymeric material slurry is vacuum stripped and recovered.

Peel adhesion tests are carried out on a modified Instron Tensile Tester. The Instron Tester is commercially available from Instron Corporation, Canton, Mass., and is modified with a specially designed jig to permit the pulling of relatively thin samples. The Instron Tester is equipped to separate two layers of a one inch (width) sample strip at a 90° angle. The Instron is used to test the 90° peel strength of the multilayer sheet at both 23° C. and 120° C. temperature conditions. The test is conducted at a speed of 1 inch per minute. Peel adhesion is measured in lbs/in.

Physical properties of the resultant multilayer sheets are determined and are set forth in Table I.

EXAMPLE 2

The procedures of Example 1 are repeated with the following exceptions: the graft coplymer is made by employing 2700 grams of polypropylene, 6550 grams of vinylidene chloride, and 418 grams of methyl acrylate instead of the amounts of the same ingredients used in Example 1.

Physical properties of the resultant polymeric compositions are determined and are set forth in Table I.

TABLE I

| | Multilayer Sheet[1] | | | | | | |
|---|---|---|---|---|---|---|---|
| | Skin Layers[a] | Tie Layers[b] | | | Barrier | Peel Strength[2] | |
| | | Graft Polymer[(1)] | | | | | |
| Examples | (mils/layer) | PP (%) | VdC (%) | (mils/layer) | Layer[c] (mils) | 23° C. | 120° C. |
| 1 | 11 | 37 | 63 | 1.5 | 3 | 8.12 | 1.68 |
| 2 | 11 | 30 | 70 | 1.5 | 3 | 13.4 | 4.16 |

[1]Multilayer sheet comprising the following:
[a]two skin layers, each in mils, of a Exxon 4092;
[b]two tie layers, each in mils, comprising a graft copolymer which is formed from polymerizing various percentages of a PP SB-751 (preformed polymer) and a monomer mixture comprising 94% vinylidene chloride and 6% methyl acrylate (monomer mixture); and
[c]a barrier layer, in mils, comprising Saran MA 119.
[2]Peel Adhesion Strength in lbs/in of sample at a speed of 1 in/min.

As can be seen from the above table, the compositions of the present invention possess good peel strength at both 23° C. and 120° C.

EXAMPLES 3-8

Relatively rigid, five layer, coextruded sheets are prepared as in Example 1, with the following exceptions:

The graft copolymer (GP) is formed as follows: 3383 grams of a preformed polymer, PP SB-751, is loaded into a ten gallon stirred polymerization reactor. To the PP SB-751 in the reactor is added 12,000 grams of demineralized water; 0.5 grams of di-tert-butylmethylphenol; 20 grams of tertiary butyl peroctoate; a monomer mixture comprising 5904 grams of vinylidene chloride and 380 grams of methyl acrylate; 80 grams of epoxidized linseed oil; and 20 grams of methylpropyl cellulose ether as a suspending agent.

The tie layer is formed by blending the graft copolymer with various amounts of a separately prepared vinylidene chloride interpolymer (post-blended polymerized monomer mixture). The separately prepared vinylidene chloride interpolymer is commercially available from The Dow Chemical Company under the trade designation Saran MA 119. Saran MA 119 has a major melting point of about 155° C. and a weight average molecular weight of 85,000.

The polymeric polyblends are formed by melt blending an admixture of the separately prepared vinylidene chloride interpolymer and graft copolymer in an extruder. The extruder is a 5.08 centimeter Hartig single screw extruder. The extruder has a 1/d ratio of 12 1. The extruder has the following set temperatures: (a) hopper temperature=160° C.; (b) melt zone temperature=170° C.; and (c) die temperature=185° C.

Physical properties of the resultant multilayer sheets are determined and are set forth in Table II.

TABLE II

| | Multilayer Sheet[1] | | | | | | |
|---|---|---|---|---|---|---|---|
| | Skin Layers[a] | Tie Layers[b] | | | Barrier | Peel Adhesion[2] | |
| | | Graft Polymer | Post-Blended Polymer[b] | | | | |
| Examples | (mils/layer) | (%) | (%) | (mils/layer) | Layer[c] (mils) | 23° C. | 120° C. |
| 3 | 11 | 100 | 0 | 1.5 | 3 | 8.11 | 1.68 |
| 4 | 11 | 85 | 15 | 1.5 | 3 | 21.97 | 4.64 |
| 5 | 11 | 80 | 20 | 1.5 | 3 | 31.16 | 3.80 |
| 6 | 11 | 73 | 27 | 1.5 | 3 | 13.77 | 2.58 |
| 7 | 11 | 66 | 34 | 1.5 | 3 | 12.54 | 2.85 |
| 8 | 11 | 50 | 50 | 1.5 | 3 | 6.77 | 1.26 |

[1]Multilayer sheet comprising the following:
[a]two skin layers, each in mils, of a Exxon 4092;
[b]two tie layers, each in mils, comprising various weight percents of a graft copolymer which is formed from [1]polymerizing various percentages of a PP SB-751 (preformed polymer) and a monomer mixture comprising 94% vinylidene chloride and 6% methyl acrylate (monomer mixture), and [2]Saran MA 119 postblended in various weight percentages; and
[c]a barrier layer, in mils, comprising Saran MA 119.
[2]Peel Adhesion Strength in lbs/in of sample at a speed of 1 in/min.

As can be seen from the above table, the compositions of the present invention possess good peel strength at both 23° C. and 120° C.

EXAMPLE 9

The procedures of Example 1 are repeated with the following exceptions: the graft coplymer is made by employing 3600 grams of PP SB-751 instead of the amounts used in Example 1, and additionally, the monomer mixture contains 3383 grams of methyl methacrylate and 380 grams of methyl acrylate instead of the vinylidene chloride and methyl acrylate used in Example 1.

Physical properties of the resultant polymeric compositions are determined and are set forth in Table III.

EXAMPLE 10

The procedures of Example 9 are repeated with the following exceptions: the graft copolymer is made by employing 3000 grams of PP SB-751 and 3600 grams of methyl methacrylate instead of the amounts used in Example 9, and 900 grams of butyl methacrylate are employed instead of the methyl acrylate.

Physical properties of the resultant polymeric compositions are determined and are set forth in Table III.

EXAMPLE 11

The procedures of Example 9 are repeated with the following exceptions: the graft coplymer is made by employing 3750 grams of PP SB-751, 3000 grams of methyl methacrylate, and 750 grams of butyl methacrylate are employed instead of the amounts of the same ingredients listed in Example 9.

Physical properties of the resultant polymeric compositions are determined and are set forth in Table III.

EXAMPLE 12

The procedures of Example 9 are repeated with the following exceptions: the graft coplymer is made by employing 4500 grams of PP SB-751, 2400 grams of methyl methacrylate, and 600 grams of butyl methacrylate are employed instead of the amounts of the same ingredients listed in Example 9.

Physical properties of the resultant polymeric compositions are determined and are set forth in Table III.

TABLE III

| | Multilayer Sheet[1] | | | | | | |
|---|---|---|---|---|---|---|---|
| | Skin Layers[a] | Tie Layers[b] | | | Barrier | Peel Adhesion[2] | |
| | | Graft Polymer[(1)] | | | | | |
| Examples | (mils/ layer) | PP (%) | MM (%) | (mils/ layer) | Layer[c] (mils) | 23° C. | 120° C. |
| 9 | 11 | 42 | 58 | 1.5 | 3 | 6.43 | 0.74 |
| 10 | 11 | 40 | 60 | 1.5 | 3 | 6.80 | 2.13 |
| 11 | 11 | 50 | 50 | 1.5 | 3 | 5.60 | 1.18 |
| 12 | 11 | 60 | 40 | 1.5 | 3 | 2.10 | 0.88 |

[1]Multilayer sheet comprising the following:
[a]two skin layers, each in mils, of a Exxon 4092;
[b]two tie layers, each in mils, comprising a graft copolymer which is formed from polymerizing various percentages of a preformed polymer (PP) SB-751 and a monomer mixture (MM) comprising about 75% methy methacrylate and about 25% butyl methacrylate; and
[c]a barrier layer, in mils, comprising Saran MA 119.
[2]Peel Adhesion Strength in lbs/in of sample at a speed of 1 in/min.

As can be seen from the above table, the compositions of the present invention possess good peel strength at both 23° C. and 120° C.

Although the invention has been described in detail with reference to specific examples thereof, it will be understood that variations can be made without departing from the scope of the invention as described above and as claimed below.

What is claimed is:

1. A multilayer structure of indefinite running length, said structure comprising:
   (A) at least one skin layer of a supporting resin;
   (B) a barrier layer comprising a vinylidene chloride interpolymer, the interpolymer being formed from a monomer mixture comprising vinylidene chloride in an amount of from about 60 to about 99 weight percent, based on total weight of monomer mixture, and at least one monoethylenically unsaturated monomer copolymerizable therewith in an amount of from about 40 to about 1 weight percent, based on total weight of monomer mixture; and
   (C) at least one tie layer interposed between each skin layer and the barrier layer, said tie layer being present in an amount of between about 5 and about 40 weight percent based on the total weight of the multilayer structure, and
   said tie layer comprising a graft copolymer polymerized from a polymerizable mixture comprising (a) at least 40 weight percent, based on total polymerizable mixture weight, of a monomer portion having as its major component a monomer selected from the group consisting of vinylidene chloride and $C_1$–$C_8$ alkyl methacrylates, and (b) a preformed polymer.

2. The multilayer structure of claim 1, wherein the skin layer is selected from the group consisting of polyolefins, polymers based on monovinylidene aromatic monomers, polyamides, and chlorinated polyolefins.

3. The multilayer structure of claim 2, wherein the polyolefin is selected from the group consisting of ultralow density polyethylene, linear low density polyethylene, high density polyethylene, polypropylene, poly 1-butene, and polymethylpentene.

4. The multilayer structure of claim 2, wherein the monovinylidene aromatic monomer is selected from the group consisting of polystyrene, and ring-substituted derivatives of polystyrene.

5. The multilayer structure of claim 4, wherein the ring-substituted derivatives of polystyrene is selected from the group consisting of poly(α-methylstyrene), and poly(α-ethylstyrene).

6. The multilayer structure of claim 1 wherein the monomer or monomers copolymerizable with the vinylidene chloride are selected from the group consisting of vinyl chloride, alkyl acrylates, alkyl methacrylates, acrylic acid, methacrylic acid, itaconic acid, acrylonitrile, and methacrylonitrile.

7. The multilayer structure of claim 6 wherein the alkyl acrylate is selected from the group consisting of methyl acrylate and ethylacrylate.

8. The multilayer structure of claim 1 wherein the monomer copolymerizable with the vinylidene chloride is vinyl chloride.

9. The multilayer structure of claim 1, wherein the preformed polymer is selected from the group consisting of olefin polymers, and polymers based on monovinylidene aromatic monomers.

10. The multilayer structure of claim 9, wherein the olefin polymer is selected from the group consisting of ultra-low density polyethylene, linear low density polyethylene, high density polyethylene: poly(1-butene), poly(1-pentene), poly(4-methyl-1pentene), poly(1-hexene), and poly(1-octene): chlorinated polyethylene: ethylene vinyl acetate; ethylene-containing propylenes: polyesterethers: ethylene carbon monoxide copolymers: or mixtures thereof.

11. The multilayer structure of claim 1, wherein the monovinylidene aromatic monomer is selected from the group consisting of styrene, poly(α-methylstyrene), and poly(α-ethylstyrene).

12. The multilayer structure of claim 1, wherein the preformed polymer is present in the polymerizable mixture in an amount of from about 10 to about 70 weight percent based on total polymerizable mixture weight.

13. The multilayer structure of claim 1, wherein the preformed polymer is present in the polymerizable mixture in an amount of from about 15 to about 40 weight percent based on total polymerizable mixture weight.

14. The multilayer structure of claim 1, wherein the monomer mixture comprises vinylidene chloride in an amount of from about 60 to about 95 percent, based on total of monmer mixture, and at least one monoethylenically unsaturated monomer copolymerizable therewith in an amount of from about 40 to about 5 percent, based on total weight of monomer mixture.

15. The multilayer structure of claim 1, wherein the monomer mixture comprises a $C_1$-$C_8$ alkyl methacrylate selected from the group consisting of methyl methacrylate, ethyl methacrylate, propyl methacrylate, and butyl methacrylate.

16. An article for the storage of foods which are sensitive to atmospheric gases, said article formed from a multilayer structure of indefinite running length, said structure comprising:
   (A) at least one skin layer of a tough, body supporting resin, said skin layer being present in an amount of between about 40 and about 90 weight percent based on the total weight of the multilayer structure;
   (B) a barrier layer which comprises a resin having high gas barrier properties, such other layer being other than the skin layer, said barrier layer being present in an amount of between about 5 and about 50 weight percent based on the total weight of the multilayer structure; and
   (C) at least one tie layer between the skin layer and the barrier layer,
   said tie layer being present in an amount of between about 5 and about 40 weight percent based on the total weight of the multilayer structure, and
   said tie layer comprising a graft copolymer comprising a polymerizable mixture which comprises (1) at least 40 weight percent, based on total polymerizable mixture weight, of a monomer portion having as its major component a monomer selected from the group consisting of vinylidene chloride and $C_1$-$C_8$ alkyl methacrylates; and (2) a preformed polymer, said preformed polymer having enough of the monomer mixture imbibed therein that the graft copolymer has at least 5 percent of the monomer mixture grafted to the preformed polymer.

17. The article of claim 16, wherein the skin layer is selected from the group consisting of polyolefins; polymers based on monovinylidene aromatic monomers; and chlorinated polyolefins.

18. The article of claim 17, wherein the polyolefin is selected from the group consisting of ultra-low density polyethylene, linear low density polyethylene, high density polyethylene, polypropylene, poly 1-butene, and polymethylpentene.

19. The article of claim 17, wherein the monovinylidene aromatic monomers is selected from the group consisting of polystyrene, and ring-substituted derivatives of polystyrene.

20. The article of claim 19, wherein the ring-substituted derivatives of polystyrene is selected from the group consisting of poly($\alpha$-methylstyrene), poly($\alpha$-ethylstyrene), poly($\alpha$-methylvinyltoluene), poly($\alpha$-methyldialkyl styrene).

21. The article of claim 16 wherein the monomer or monomers copolymerizable with the vinylidene chloride are selected from the group consisting of vinyl chloride, alkyl acrylates, alkyl methacrylates, acrylic acid, methacrylic acid, itaconic acid, acrylonitrile, and methacrylonitrile.

22. The article of claim 21 wherein the alkyl acrylate is selected from the group consisting of methyl acrylate and ethylacrylate.

23. The multilayer structure of claim 16, wherein the preformed polymer is selected from the group consisting of olefin polymers, and polymers based on monovinylidene aromatic monomers.

24. The article of claim 23, wherein the olefin interpolymer is selected from the group consisting of ultra-low density polyethylene, linear low density polyethylene, high density polyethylene: poly(1-butene), poly(1-pentene), poly(4-methyl-1-pentene), poly(1-hexene), and poly(1-octene): chlorinated polyethylene; ethylene vinyl acetate: ethylene-containing propylenes: polyesterethers: ethylene carbon monoxide copolymers; or mixtures thereof.

25. The article of claim 23, wherein the monovinylidene aromatic monomer is selected from the group consisting of styrene, poly($\alpha$-methylstyrene), and poly($\alpha$-ethylstyrene).

26. The article of claim 16, wherein the preformed polymer is present in the polymerizable mixture in an amount of from about 10 to about 70 weight percent based on total polymerizable mixture weight.

27. The article of claim 26, wherein the preformed polymer is present in the polymerizable mixture in an amount of from about 15 to about 40 weight percent based on total polymerizable mixture weight.

28. The multilayer structure of claim 16, wherein monomer mixture comprises vinylidene chloride in an amount of from about 60 to about 95 percent, based on total weight of monomer mixture, and at least one monoethylenically unsaturated monomer copolymerizable therewith in an amount of from about 40 to about 5 percent, based on total weight of monomer mixture.

29. The multilayer structure of claim 16, wherein monomer mixture comprises a $C_1$-$C_8$ alkyl methacrylate selected from the group consisting of methyl methacrylate, ethyl methacrylate, propyl methacrylate, butyl methacrylate, octyl methacrylate, and laurylmethacrylate.

30. An article for the storage of foods which are sensitive to atmospheric gases, said structure comprising:
   (A) at least one skin layer of polypropylene, said skin layer being present in an amount of between about 40 and about 90 weight percent based on the total weight of the multilayer structure;
   (B) a barrier layer which comprises a vinylidene chloride interpolymer, said barrier layer being present in an amount of between about 5 and about 50 weight percent based on the total weight of the multilayer structure; and
   (C) at least one tie layer between the skin layer and the barrier layer,
   said tie layer being present in an amount of between about 5 and about 40 weight percent based on the total weight of the multilayer structure, and
   said tie layer comprising a graft copolymer which comprises a polymerizable mixture of a (1) at least 40 weight percent, based on total polymerizable mixture weight, of a monomer portion having as its major component a monomer selected from the group consisting of vinylidene chloride and $C_1$-$C_8$ alkyl methacrylates, said monomer selected from the group consisting of (a) vinylidene chloride in an amount of from about 60 to about 95 percent and at least one monoethylenically unsaturated monomer copolymerizable therewith in an amount of from about 40 to about 5 percent, said weight percents being based on total weight of the monomer; and (b) a $C_1$-$C_8$ alkyl methacrylate selected from the group consisting of methyl methacrylate, ethyl methacrylate, propyl methacrylate, butyl methacrylate, octyl methacrylate, and laurylmethacrylate;

and (2) a preformed polymer, said preformed polymer being selected from the group consisting of olefin polymers.

31. A multilayer structure of indefinite running length, said structure comprising:
   (A) at least one skin layer of a supporting resin;
   (B) a barrier layer comprising a vinylidene chloride interpolymer, the interpolymer being formed from a monomer mixture comprising vinylidene chloride in an amount of from about 60 to about 99 weight percent, based on total weight of monomer mixture, and at least one monoethylenically unsaturated monomer copolymerizable therewith in an amount of from about 40 to about 1 weight percent, based on total weight of monomer mixture; and
   (C) at least one tie layer interposed between each skin layer and the barrier layer, said tie layer being present in an amount of between about 5 and about 40 weight percent based on the total weight of the multilayer structure, and
   said tie layer comprising a graft copolymer polymerized from a polymerizable mixture comprising (a) from about 95 to about 15 weight percent of a monomer portion having vinylidene chloride as its major component, and (b) from about 5 to about 85 weight percent of a preformed polymer, said weight percents being based upon the total polymerizable mixture weight.

32. An article for the storage of foods which are sensitive to atmospheric gases, said article formed from a multilayer structure of indefinite running length, said structure comprising:
   (A) at least one skin layer of a tough, body supporting resin, said skin layer being present in an amount of between about 40 and about 90 weight percent based on the total weight of the multilayer structure;
   (B) a barrier layer which comprises a resin having high gas barrier properties, such other layer being other than the skin layer, said barrier layer being present in an amount of between about 5 and about 50 weight percent based on the total weight of the multilayer structure; and
   (C) at least one tie layer between the skin layer and the barrier layer,
   said tie layer being present in an amount of between about 5 and about 40 weight percent based on the total weight of the multilayer structure, and
   said tie layer comprising a graft copolymer comprising a polymerizable mixture which comprises (1) from about 95 to about 15 weight percent, based on total polymerizable mixture weight, of a monomer portion having vinylidene chloride as its major component; and (2) from about 5 to about 85 weight percent, based on total polymerizable mixture weight, of a preformed polymer, said weight percents being based upon the total polymerizable mixture weight.

* * * * *